United States Patent [19]

Off et al.

[11] 4,328,061
[45] May 4, 1982

[54] APPARATUS FOR DEPOSITING ADHESIVE STRIPS

[75] Inventors: Joseph W. A. Off, Irving; Judson H. Early, Dallas; William B. Greer, Grand Prairie, all of Tex.

[73] Assignee: Haggar Company, Dallas, Tex.

[21] Appl. No.: 88,557

[22] Filed: Oct. 26, 1979

Related U.S. Application Data

[62] Division of Ser. No. 845,450, Oct. 25, 1977, Pat. No. 4,214,933.

[51] Int. Cl.³ .................. B26D 5/26; B32B 31/00; B65H 25/32
[52] U.S. Cl. .................. 156/353; 156/361; 156/378; 156/497; 156/521; 156/522; 156/523; 156/540; 156/541; 156/574; 156/578; 156/583.1; 156/584
[58] Field of Search .............. 156/497, 517, 519, 523, 156/526, 527, 540, 574, 577, 583.1, 584, 582, 541, 361, 378, 521, 522, 578, 353, 368

[56] References Cited

U.S. PATENT DOCUMENTS

| | | | |
|---|---|---|---|
| 1,029,308 | 6/1912 | Merwin et al. | 156/577 |
| 2,227,497 | 1/1941 | Hallman | 156/582 |
| 3,007,838 | 11/1961 | Eigenmann | 156/526 |
| 3,369,952 | 2/1968 | Rieger | 156/577 |
| 3,540,969 | 11/1970 | Jorgensen | 156/519 |
| 3,775,219 | 11/1973 | Karlson et al. | 156/526 |
| 3,964,835 | 6/1976 | Eigenmann | 156/577 |
| 3,992,244 | 11/1976 | Craig et al. | 156/541 |
| 3,993,526 | 11/1976 | Off et al. | 156/267 |
| 4,025,382 | 5/1977 | Del Rosso | 156/497 |
| 4,128,451 | 12/1978 | Sorce et al. | 156/582 |

Primary Examiner—Michael G. Wityshyn
Attorney, Agent, or Firm—Richards, Harris & Medlock

[57] ABSTRACT

In an apparatus for and method of depositing adhesive strips, a ribbon including a layer of adhesive is directed along a predetermined input path. In the first two embodiments, the ribbon is engaged between a measuring roller and a driven roller responsive thereto, and fed into positioning structure. The material on which the adhesive is to be deposited is located between the positioning structure and a head, which can be heated. Separation means is provided adjacent the input path for selectively separating at least a portion of the ribbon to form adhesive strips, after which the strip of adhesive, the material and the head are engaged to effect deposition of the activated adhesive strip onto the material. In a third embodiment, the ribbon is engaged by a feed pulley and directed toward a revolving wheel rotatably interconnected with the feed pulley. The wheel, which can be heated, receives and transports the ribbon along a portion of the periphery thereof to press the activated adhesive into engagement with the adjacent material. Both the feed pulley and the wheel are mounted on a frame which is rotatably supported so that strips of adhesive can be applied in linear or curvilinear fashion. If desired, separation means can be provided between the feed pulley and the wheel for selectively separating at least a portion of the ribbon to form adhesive strips of predetermined lengths.

41 Claims, 8 Drawing Figures

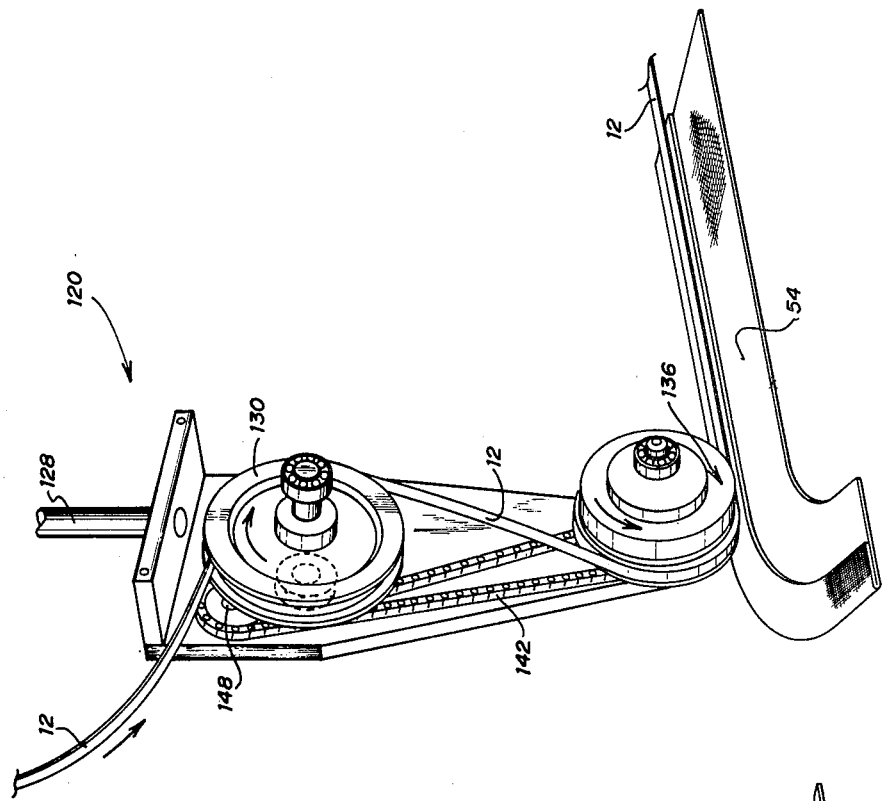
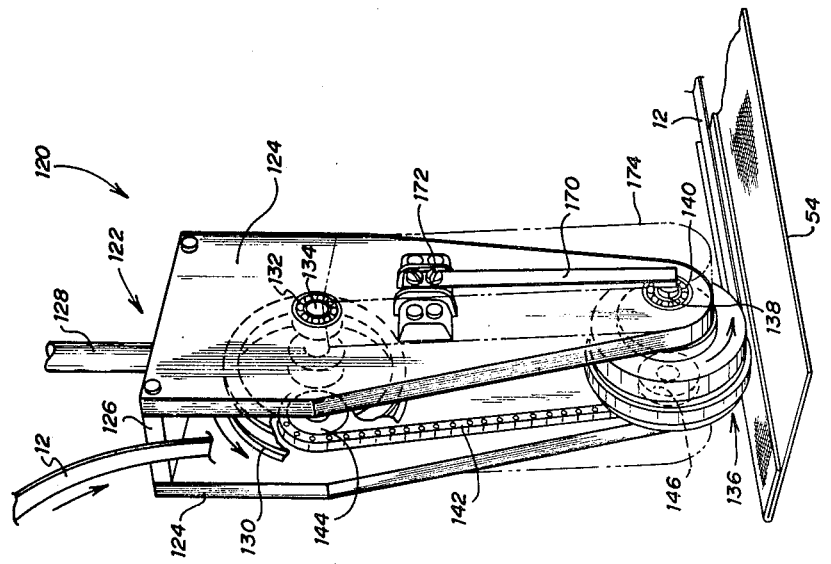

APPARATUS FOR DEPOSITING ADHESIVE STRIPS

This is a division of now U.S. Pat. No. 4,214,933 application Ser. No. 845,450 filed Oct. 25, 1977.

BACKGROUND AND SUMMARY OF THE INVENTION

This invention relates to an apparatus for and method of depositing adhesives, and more particularly to an apparatus capable of the precise deposition of adhesive strips on a length or piece of material, such as metal, plastic or fabric.

In particular, the manufacture of garments from fabric materials has traditionally involved numerous sewing procedures. These sewing procedures were formerly carried out manually by individual tailors wielding needles and thread. The advent of the sewing machine signaled a vast improvement in the art, however, extensive human interaction is still necessary in virtually every phase of garment fabrication since sewing procedures are not readily adaptable to automation. In particular, numerous manual operations are required in the fabrication of components for a garment. For example, the construction of pockets alone involves many time-consuming manual operations which tend to boost the manufacturing cost for the entire garment. In an attempt to eliminate these time-consuming and costly manual operations, there recently has been some interest in the use of adhesive connection techniques as a replacement for stitched seams. However, the proficient utilization of adhesive materials in garment fabrication requires an accurate means for positioning adhesive material at a predetermined location on fabric material which has not heretofore been available, other than manually.

The present invention comprises an apparatus for depositing adhesives which overcomes the foregoing and other problems long since associated with the prior art. In accordance with the broader aspects of the invention, a ribbon of adhesive is directed along a predetermined path adjacent to a length or piece of material for deposition. The adhesive ribbon can comprise a substance responsive to heat, radiation, pressure, or ultrasonic vibration. A precise length of adhesive formed from the ribbon is metered into proximity with the material before activation and engagement to attach the strip of adhesive thereto. Consequently, utilization of the invention permits predetermined strips of adhesive to be attached at precise locations to a length or piece of material prior to subsequent fabrication operations. The apparatus functions on an automatic basis, thus eliminating many heretofore required manual trimming and positioning operations associated with the use of adhesives in various operations. While the invention is particularly suited to the deposition of adhesives onto fabric, it will be understood that the invention can be utilized with metals, plastics or other materials.

In accordance with more specific aspects of the invention, a ribbon of adhesive is drawn from a roll of ribbon. The adhesive ribbon may include a backing on one side of the adhesive. In a first embodiment of the invention, adhesive ribbon with a backing on one side thereof is engaged between measuring and feed rollers and directed into positioning structure. Prior to entering the positioning structure, separation means responsive to the measuring roller traverses and separates the adhesive layer of the ribbon from the backing to provide an adhesive strip of preselected length. Subsequent rollers draw the adhesive ribbon into positioning structure located adjacent a length or piece of material onto which the adhesive is to be deposited. With the strip of adhesive disposed between the backing and the length of material, a movable head is actuated to press the material and the adhesive strip into engagement with the positioning structure, thereby securing the adhesive strip to the adjacent material. The head itself can be heated or ultrasonically vibrated to activate the adhesive, or an outside source of radiation or heat could be used, if desired. The deposited adhesive strip is disconnected from the backing strip, by which the next strip of adhesive is drawn into the positioning structure.

In a second embodiment of the invention, measuring and feed rollers engage and advance the adhesive ribbon between fixed and movable blades into positioning structure adjacent a length or piece of material. The presence of a backing on one side of the adhesive ribbon is not required for the operation of this embodiment. After positioning of the adhesive ribbon, a movable portion of the positioning structure extends to simultaneously shear the ribbon and to press the material and sheared strip of adhesive into engagement with a stationary head. If desired, the material can then be advanced around a series of rollers to remove any backing from the attached adhesive strip. In both of the first embodiments, the material can be advanced through the apparatus at any desired orientation relative thereto. Thus, the first two embodiments of the invention function to deposit substantially straight strips of adhesive at precise locations on a piece of material.

In a third embodiment of the invention, an apparatus for depositing strips of adhesive is mounted on steerable post structure. The incoming adhesive ribbon is engaged by a feed and metering pulley which is rotatably mounted in the post structure. The adhesive ribbon is directed toward a revolving wheel which is drivingly interconnected with the feed pulley. Means are provided for precision stopping and starting of the adhesive ribbon in the apparatus, if desired. Preferably, separation means responsive to the feed pulley are provided to separate the adhesive ribbon into strips of preselected length. The revolving wheel includes a circumferential recess for receiving and guiding the adhesive strip into engagement with the underlying material. The adhesive strip is activated as it is guided into engagement. The wheel itself can be heated or ultrasonically vibrated to activate the adhesive, or an outside source of radiation or heat can be used, if desired. In the third embodiment, the apparatus can be steered relative to the adjacent material, which affords directional capability whereby relatively longer adhesive strips can be precisely deposited in linear or curvilinear fashion.

DESCRIPTION OF THE DRAWINGS

A more complete understanding of the invention may be had by reference to the following Detailed Description when taken in conjunction with the accompanying Drawings, wherein:

FIG. 3 is a diagrammatic illustration of a third embodiment of the invention in which certain parts have been broken away to illustrate more clearly certain features of the invention;

FIG. 4 is an illustration of a first modification of the apparatus of FIG. 3 in which certain parts have been broken away to illustrate more clearly certain features of the invention;

DETAILED DESCRIPTION

Figure 1:
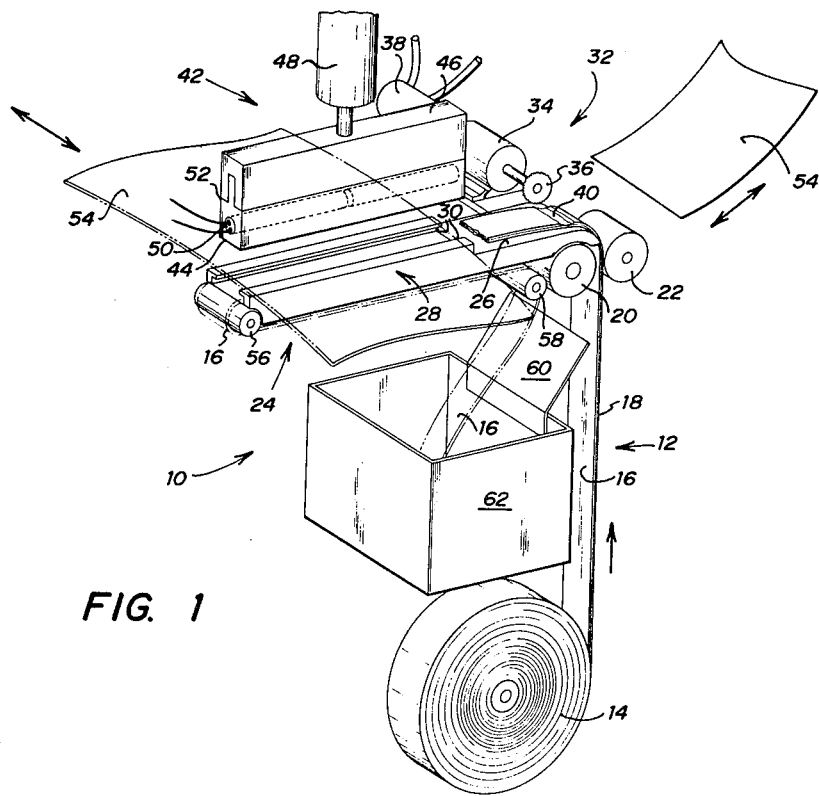
FIG. 1 is a diagrammatic illustration of an apparatus for depositing adhesives incorporating a first embodiment of the invention in which certain parts have been broken away to illustrate more clearly certain features of the invention.

Referring now to the Drawings wherein like reference characters designate like or corresponding parts throughout the several views, and particularly to FIG. 1 thereof, there is shown an apparatus for depositing adhesives 10 incorporating a first embodiment of the invention. The apparatus 10 can be utilized to deposit adhesive onto rigid, semi-rigid or flexible materials including metal, plastic or fabric. The apparatus 10 is particularly useful in the precise deposition of adhesives on lengths or pieces of flexible material, such as fabric, prior to subsequent fabrication operations. In the practice of the invention, an adhesive ribbon 12 is fed into the apparatus 10 from a supply reel 14. Ribbon 12 comprises a backing 16 coated on one side with a layer of adhesive 18. Backing 16 of ribbon 12 is preferably at least as wide as adhesive 18. Ribbon 12 may be of the type produced by General Fabric Fusing Co. of Cincinnati, Ohio, in which the backing 16 is formed of paper, and the adhesive layer 18 comprises nylon, polyamide or polyester substance. If desired, pressure sensitive ribbon could also be used in the practice of the invention.

The incoming ribbon 12 is frictionally engaged between driven roller 20 and idler roller 22. Preferably, rollers 20 and 22 are coated with a skid-resistant substance, such as rubber, so that no slippage occurs during advancement of ribbon 12. Roller 22 is connected to a transducer (not shown) by which precise measurement can be made of the length of ribbon 12 advanced thereby. Roller 22 thus performs a measuring function. Drive roller 20 is responsive to measuring roller 22 to intermittently advance ribbon 12.

Rollers 20 and 22 direct ribbon 12 into engagement with positioning structure 24. Positioning structure 24 includes flat surface 26 which serves to support ribbon 12 during advancement. In this regard, it is pointed out that ribbon 12 is fed into apparatus 10 so that the side having backing 16 thereon will be positioned against surface 26. Positioning structure 24 includes guide portion 28 located along the transportation path of ribbon 12. Guide portion 28 can comprise any suitable configuration, such as opposed grooves 30, or opposed fence sections (not shown).

Cutting assembly 32 positioned adjacent surface 26 functions to separate adhesive 18 of ribbon 12 into strips of adhesive 18. Cutting assembly 32 comprises an electric motor 34 driving a small milling cutter 36. Motor 34 is mounted for movement toward and away from the path of ribbon 12, and is actuated by double acting cylinder 38. Cylinder 38 is responsive to measuring roller 22 so that rotating cutter 36 is caused to selectively traverse ribbon 12. Cutting assembly 32 is positioned adjacent surface 26 so that only adhesive layer 18 is severed when rotating milling cutter 36 traverses ribbon 12. Consequently, after a predetermined length of ribbon 12 passes measuring roller 22, cutting assembly 32 is actuated to produce a separation 40 in the adhesive layer 18 carried on backing 16. It will be understood that creation of separation 40, which serves as a transition zone in adhesive layer 18 between successive adhesive strips, comprises a significant feature of the present invention.

Following the actuation of cutting assembly 32 to cause a separation 40 in the adhesive portion of ribbon 12, drive roller 20 is again actuated to advance ribbon 12 into guide portion 28. Preferably, when ribbon 12 is advanced to this station separation 40 will be positioned in the middle of the entrance to guide portion 28.

Activation assembly 42 is disposed immediately above positioning structure 24 and is mounted for reciprocal movement toward and away from the path of ribbon 12. Assembly 42 is responsive to measuring roller 22. In particular, activation assembly 42 comprises an elongate head 44 connected to cross member 46, which is actuated by double acting cylinder 48. Head 44 may be constructed of any suitable material, such as steel, molded rubber or aluminum, and preferably includes means for maintaining head 44 at an elevated temperature sufficient to activate adhesive 18. If desired, head 44 could include an ultrasonic source (not shown) to effect activation of the adhesive. Alternatively, an outside source of radiation or heat could be used. In accordance with the preferred construction, electrical resistance element 50 is provided within head 44. Electrical resistance element 50 is connected to a suitable source of electricity and raises the temperature across the face of head 44. Insulation 52 is provided between head 44 and cross member 46 to prevent undesirably high temperatures in components other than head 44.

A length or piece of material 54 on which it is desired to deposit a strip of adhesive 18 is placed between activation assembly 42 and positioning structure 24. Material 54 can comprise any suitable rigid, semi-rigid or flexible material, the exact composition of which is not critical to the practice of the invention. Material 54 can comprise, for example, metal, plastic or fabric. In particular, the side of material 54 on which the strip of adhesive 18 is desired, is positioned away from head 44. It will be understood that material 54 may comprise a continuous length thereof which is transported through apparatus 10 by any conventional means, for example, by spaced pairs of rollers (not shown). Moreover, it will be appreciated that material 54 can be transported between activation assembly 42 and positioning structure 24 at any preselected angle relative thereto so that the strips of adhesive 18 can be applied with precisely predetermined orientations.

With material 54 and a strip of adhesive 18 in the desired relative orientation, cylinder 48 actuates head 44 into engagement with the side of material 54 opposite the adhesive strip. Head 44, which is no wider than guide portion 28, moves down between grooves 30 to press material 54 and the underlying strip of adhesive 18 into engagement with structure 24. Simultaneously, sufficient energy is applied to activate the adhesive thereby causing the strip of adhesive 18 to adhere to material 54. Where ribbon 12 comprises a pressure sensitive adhesive, the pressure alone of head 44 may be sufficient to accomplish activation. It is noted that the contact face of head 44 preferably includes a layer of nonstick material, such as TEFLON, to discourage clinging between material 54 and activation assembly 42.

It will be understood that the provision of separation 40 in adhesive 18 provides a transition zone between the adhesive strip being activated and the next strip to be activated. Consequently, upon retraction of head 44 there is no taffy effect of stringy material pulling between activated and nonactivated zones. Thus, the provision of a substantial gap between successive strips of adhesive 18 whereby the ends of each strip remain well defined considerably increases the precision with which strips of adhesive 18 can be applied to material 54 by apparatus 10.

Following cycling of activation assembly 42, the advancement of material 54 simultaneously separates the deposited strip of adhesive 18 from backing 16 and repositions material 54 for the next application. Roller 20 advances the next strip of adhesive 18 into guide portion 28. Backing 16 simultaneously exits guide portion 28 passing over roller 56 and between idler roller 58 and driven roller 20. Therefore, as the next strip of adhesive 18 is drawn into position for deposition, the backing 16 which supported the previous strip is advanced past deflector plate 60 into scrap receptacle 62.

In sum, the operational sequence of apparatus 10 begins with the introduction of ribbon 12 between rollers 20 and 22. Drive roller 20 is responsive to measuring roller 22 to direct ribbon 12 along positioning structure 24. After each predetermined advancement, cutting assembly 32 is actuated to create separations 40 in adhesive layer 18 between successive strips of adhesive. Each strip of adhesive 18 is then advanced into guide portion 28 beneath material 54 so that separation 40 preferably coincides with the point of contact of one end of head 44. After cycling activation assembly 42, the material 54 and ribbon 12 are advanced to their next respective positions, as the separated backing 16 is collected.

Figure 2:
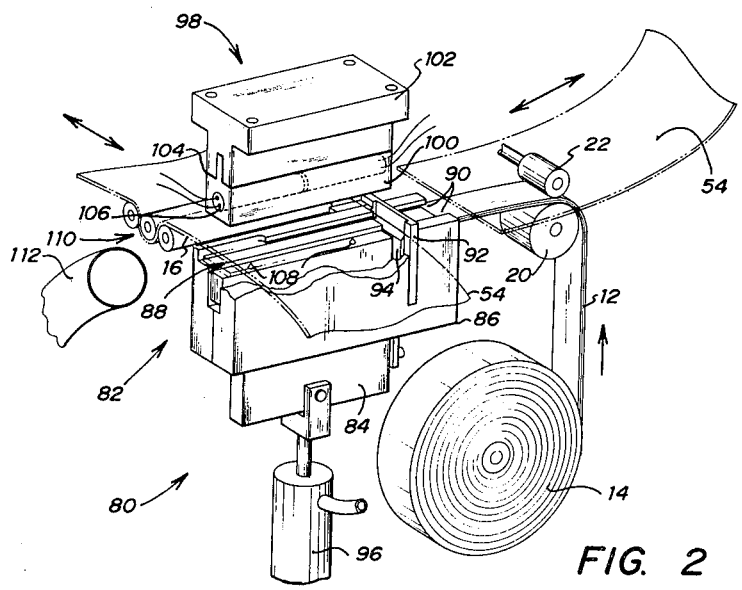
FIG. 2 is a diagrammatic illustration of a second embodiment of the invention in which certain parts have been broken away to illustrate more clearly certain features of the invention.

Referring now to FIG. 2, there is shown an apparatus for depositing adhesives 80 incorporating a second embodiment of the invention. As in the case of apparatus 10, adhesive ribbon 12 is directed into apparatus 80 from reel 14 between rollers 20 and 22. The ribbon 12 can comprise adhesive 18 with or without backing 16 on one side thereof. It will be understood that the presence of backing 16 is not critical to the operation of apparatus 80.

Drive roller 20 and measuring roller 22 direct ribbon 12 therebetween into engagement with positioning assembly 82. Positioning assembly 82 comprises a movable portion 84 within a stationary portion 86. The upper ends of movable portion 84 and stationary portion 86 define the guide portion 88 which functions to receive ribbon 12 prior to deposition. In particular, guide portion 88 can comprise opposed grooves 90, or other suitable structure. Ribbon 12 enters guide portion 88 passing over a first surface of stationary portion 86, between blades 92 and 94, and on into a position above movable portion 84. Blade 92 is rigidly attached to stationary portion 86, while blade 94 is attached to movable portion 84. The lower end of movable portion 84 is coupled to double acting cylinder 96, which is responsive to measuring roller 22. Cylinder 96 functions to selectively actuate the upper end of movable portion 84 into engagement with ribbon 12 stationed in positioning assembly 82.

Activation assembly 98 is substantially stationary and is located immediately above positioning assembly 82. Preferably, activation assembly 98 is mounted resiliently rather than fixedly to withstand the shock of contact with movable portion 84. In most other respects, activation assembly 98 is substantially similar to activation assembly 42. Assembly 98 comprises an elongate head 100, a cross member 102 and an insulative layer 104 therebetween. Head 100 can be maintained at an elevated temperature by electrical resistance element 106 located therein if adhesive 18 is thermally responsive. Head 100 is no wider than the interior edges of guide portion 88. Preferably, head 100 is narrower than guide portion 88 and ribbon 12 so that activation occurs only in the central area thereof to prevent clogging of guide portion 88 which would occur if the entire width of adhesive strip 18 were activated.

A length of material 54 is transported through apparatus 80 between activation assembly 98 and positioning assembly 82. The side of material 54 on which the adhesive is desired faces positioning assembly 82 and ribbon 12 therein. Material 54 may be directed through apparatus 80 by any suitable conventional means at any angle relative to positioning assembly 82 to achieve the desired orientation of the deposited adhesive.

When a predetermined length of adhesive ribbon 12 has been directed into positioning assembly 82, cylinder 96 actuates movable portion 84 upward toward activation assembly 98. Ribbon 12 is severed between blades 92 and 94 as movable portion 84 causes the resultant adhesive strip and material 54 to engage head 100 and thus effect deposition of the adhesive strip. Projections 108 are provided in the upper end of movable portion 84 to immobilize the forward portion of ribbon 12 during the shearing and lifting operation. After retraction of movable portion 84, material 54 and ribbon 12 are advanced. If desired, material 54 can be transported about rollers 110 to cause separation of any backing 16 from the deposited strip of adhesive formed from ribbon 12. In addition, suction tube 112 connected to a vacuum system (not shown) can be positioned adjacent rollers 110 to remove the separated strips of backing 16.

If desired, cutting assembly 32 described hereinbefore in conjunction with apparatus 10 could be utilized with apparatus 80 in place of blades 92 and 94. Thus, separations between successive adhesive strips 18 carried on backing 16 would be provided prior to actuation of movable portion 84.

In sum, the operational sequence of apparatus 80 begins with the advancement of a predetermined length of adhesive ribbon 12 into positioning assembly 82 by drive roller 20 and measuring roller 22. Movable portion 84 is actuated to simultaneously shear ribbon 12 between blades 92 and 94 and to press the sheared portion of ribbon 12 together with material 54 into engagement with head 100. The duration of engagement is sufficient to secure the adhesive to material 54, after which movable portion 84 retracts. Material 54 and ribbon 12 are then advanced to start the sequence once more.

In reference now to FIG. 3, there is shown an apparatus for depositing adhesives 120 incorporating a third embodiment of the invention. Apparatus 120 includes steerable post structure 122 which comprises side plates 124 attached to cross member 126 carried by post 128. Post 128 is mounted for rotation about the vertical axis thereof in suitable support structure so that apparatus 120 can be steered to deposit an adhesive ribbon 12 in linear or curvilinear fashion on material 54.

Adhesive ribbon 12 is received within apparatus 120 and into engagement with drive pulley 130. Pulley 130 is mounted for rotation between side walls 124. Bearings 132 located in side walls 124 rotatively support shaft 134 on which drive pulley 130 is mounted. Pulley 130 can be driven by conventional means, such as a motor acting through a clutch/brake. Pulley 130 includes a peripheral groove in which the ribbon 12 is received and transported. The peripheral groove of pulley 130 may include, if desired, a coating of skid-resistant substance to prevent slippage of ribbon 12 during advancement. A measuring transducer (not shown) is connected to pulley 130 so that the precise length of ribbon 12 advanced thereby can be measured. Consequently, the quantity of ribbon 12 received and fed along a portion of the periphery of pulley 130 is simultaneously measured thereby.

Ribbon 12 is directed by pulley 130 toward engagement with wheel 136. Wheel 136 is mounted for rotation beneath pulley 130 and between the lower ends of side walls 124 in post structure 122. In particular, wheel 136 is mounted on shaft 138 which rotates in bearings 140 located in side walls 124. Pulley 130 and wheel 136 are drivingly connected. Endless chain 142 interconnects sprockets 144 and 146, which are attached to shafts 134 and 138, respectively. By this means, wheel 136 is caused to rotate in unison with pulley 130.

It will be appreciated that pulley 130 and wheel 136 can be caused to rotate in the same or opposite directions. As shown in FIG. 3, chain 142 and sprockets 144 and 146 drivingly connect pulley 130 and wheel 136 for rotation in the same direction. When directly interconnected in this manner, it will be appreciated that ribbon 12 contacts a relatively small peripheral portion of pulley 130. Pulley 130 can be caused to rotate in a direction opposite to the rotational direction of wheel 136 with the addition of idler sprocket 148 as shown in FIG. 4. The modification depicted in FIG. 4 allows a relatively longer segment of ribbon 12 to engage the periphery of pulley 130. It will be understood that either the interconnection of FIG. 3 or the modified interconnection of FIG. 4 can be utilized in apparatus 120.

Figure 8:
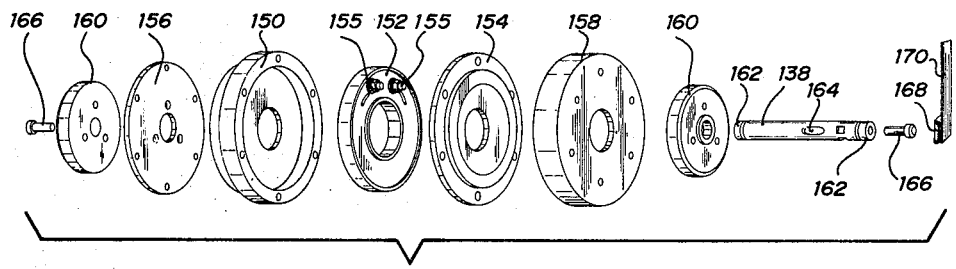
FIG. 8 is an exploded view illustrating the revolving heated wheel assembly of the third inventive embodiment.

With reference to FIG. 8 in conjunction with FIG. 3, wheel 136 includes an applicator portion 150 having a relatively thick periphery. Applicator portion 150 is constructed of any suitable material, such as aluminum. In accordance with the preferred construction, circular heating band 152 is secured within applicator portion 150 by clamp ring 154. Heating band 152 encloses an electrical resistance element by which the periphery of applicator portion 150 is maintained at an elevated temperature sufficient to activate adhesive ribbon 12. Heating band 152 includes terminals 155 for connecting the resistance element therein with a suitable source of electricity. Applicator portion 150, heating band 152 and clamp ring 154 are sandwiched between insulator plate 156 and insulator disc 158. Plate 156 and disc 158 are comprised of suitable insulative material and are provided to prevent undesirably high temperatures in components away from applicator portion 150. Plate 156 and disc 158 in turn are secured between hubs 160 which are mounted on shaft 138. Insulator bushings 162 are included at each end of hollow shaft 138. An opening 164 positioned along shaft 138 permits passage of wires connecting heating band terminals 155 and brush contacts 166 mounted in bushings 162. Wheel 136 rotates in bearings 140 with brush contacts 166 engaging brushes 168. Each brush 168 is carried by spring arm 170 attached to an insulator block 172 mounted on side wall 124. It will be apparent that connection of spring arms 170 to a suitable power source provides the electricity which causes applicator portion 150 to be heated by heating band 152. Covers 174 are provided on both side walls 124 to prevent accidental contact with electrical conductors. If desired, an ultrasonic source could be located inside or attached to wheel 136 for activation of ribbon 12.

Referring again to FIG. 3, ribbon 12 is received by wheel 136 and directed into engagement with material 54. If wheel 136 is heated or ultrasonically vibrated, adhesive ribbon 12 becomes activated during transportation on a portion of the periphery of wheel 136. During this time interval, wheel 136 applies sufficient energy to the adhesive of ribbon 12 to effect activation thereof. Simultaneously, wheel 136 presses the now activated adhesive of ribbon 12 into engagement with the underlying material 54. Alternatively, an outside source of radiation or heat could be used to activate the adhesive during engagement with material 54. In this manner, a strip of adhesive ribbon 12 can be applied to material 54 prior to subsequent fabrication operations. Selective rotation of post structure 122 relative to material 54 permits the application of adhesive ribbon 12 thereto along straight or curved paths.

Figure 5:
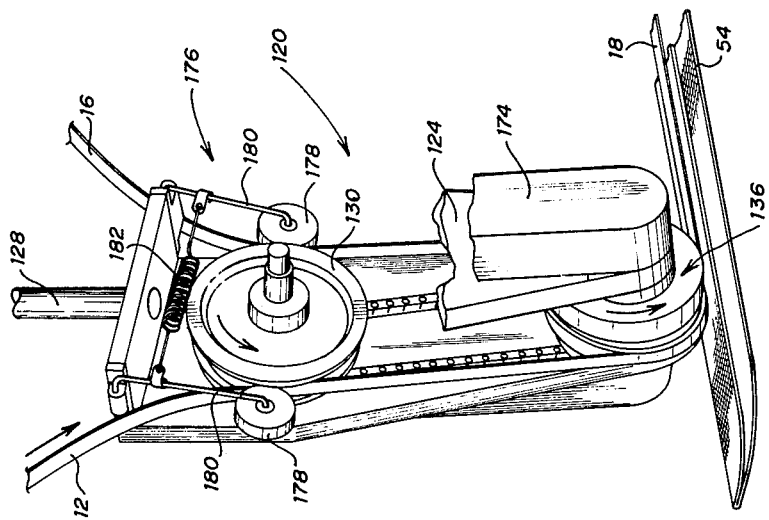
FIG. 5 is an illustration of a second modification of the apparatus of FIG. 3 in which certain parts have been broken away to illustrate more clearly certain features of the invention.

With reference to FIG. 5 in conjunction with FIG. 3, there is shown a retainer assembly 176 which can be utilized with apparatus 120. Retainer assembly 176 is particularly useful when ribbon 12 comprises a backing 16 coated on one side with a layer of adhesive 18. Retainer assembly 176 comprises a pair of rollers 178 which engage pulley 130 therebetween. Each roller 178 is rotatively carried by an arm 180 pivotally connected to post structure 122. Spring 182 interconnects arms 180 to urge rollers 178 against pulley 130. Ribbon 12 is fed between first roller 178 and pulley 130 so that backing 16 contacts wheel 136. As the adhesive 18 is deposited, backing 16 continues around wheel 136 and is drawn upward between pulley 130 and second roller 178 for collection. It is noted that since pulley 130 and wheel 136 are drivingly interconnected, backing 16 is not required for the operation of retainer assembly 176. If desired, retainer assembly 176 can be utilized in the absence of backing 16 on ribbon 12.

Figure 6:
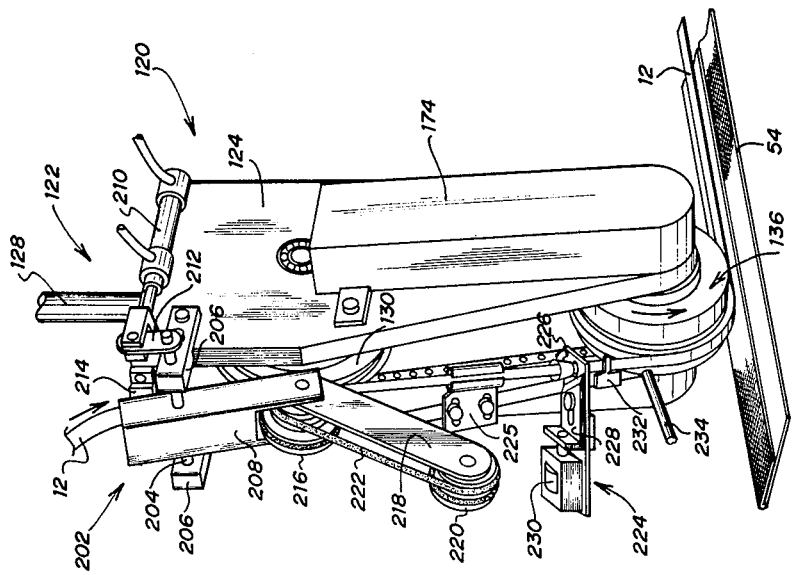
FIG. 6 is an illustration of a third modification of the apparatus of FIG. 3.

Referring now to FIG. 6, there is shown another modification of the apparatus for depositing adhesives 120. Apparatus 120 can be utilized with start/stop assembly 202 and cutting assembly 224 for increased capability.

Start/stop assembly 202 is positioned adjacent pulley 130 on post structure 122. Assembly 202 includes a rod 204 rotatably supported in extensions 206. Extensions 206 project in spaced parallel relationship from side walls 124. Adhesive ribbon 12 enters apparatus 120 adjacent member 208 which is mounted on rod 204 between extensions 206. Double acting cylinder 210 is coupled to crank arm 212 attached to rod 204 and is responsive to measuring pulley 130. It will thus be apparent that actuation of cylinder 210 causes member 208 to rotate about the horizontal axis of rod 204.

Stop/start assembly 202 further includes stop 214 mounted on structure 122 adjacent the upper end of member 208. Roller 216 is mounted for rotation in the lower end of member 208 and adjacent pulley 130. If desired, stop/start assembly 202 can include arm 218, which, for clarity, is shown in a position pivoted away from the path of ribbon 12. Arm 218 is pivotally attached to the lower end of member 208 and includes rotatably mounted roller 220 at the lower end thereof. Endless belt 222 drivingly connects rollers 216 and 220 for rotation in unison. It will thus be apparent that optional arm 218 together with roller 220 and belt 222 can be positioned so as to provide additional support for ribbon 12 between pulley 130 and wheel 136.

As ribbon 12 proceeds toward wheel 136, it is guided into cutting assembly 224 by guide 225. Guide 225 is adjustably mounted for displacement so that ribbon 12 can be precisely guided into cutting assembly 224. Cutting assembly 224 comprises a plate 226 extending across the path of ribbon 12 and having an aperture therein for ribbon 12 to pass therethrough. Movable blade 228 actuated by solenoid 230 is slidably mounted on plate 226. Solenoid 230 is connected to a conventional source of power and is responsive to measuring pulley 130 to selectively extend blade 228 shearing ribbon 12. Preferably, finger 232 is located beneath cutting assembly 224 to prevent the severed end of ribbon 12 from falling away from wheel 136. If desired, an air jet 234 can be positioned beneath cutting assembly 224 to better maintain the end of ribbon 12 in contact with wheel 136.

The operational sequence of modified apparatus 120 begins with the receipt of ribbon 12 between stop/start assembly 202 and pulley 130. Ribbon 12 passes between the upper end of member 208 and stop 214 into engagement with pulley 130. Roller 216 maintains positive nonslip engagement between ribbon 12 and pulley 130, after which ribbon 12 is advanced toward guide 225 by roller 220. Guide 225 aligns ribbon 12 for passage through cutting assembly 224, then around the periphery of wheel 136 and into engagement with material 54.

When a predetermined length of ribbon 12 has been advanced, cylinder 210 functions to pivot rod 204. Member 208 pivots with rod 204 to block ribbon 12 against stop 214, while simultaneously disengaging roller 216 from pulley 130. It will be apparent that the blockage of ribbon 12 together with the simultaneous disengagement of the feed means instantaneously halts the transport of adhesive ribbon 12. Thus, ribbon 12 stops precisely, eliminating the carry-through effect resulting from the inertias of pulley 130 and wheel 136. With ribbon 12 halted, solenoid 230 cycles to shear ribbon 12 in cutting assembly 224. The remainder of the previous strip of adhesive ribbon 12 is applied to material 54 by wheel 136, and cylinder 210 is actuated in reverse to start the feeding and deposition of the next adhesive strip to be cut from ribbon 12. It will thus be apparent that assemblies 202 and 224 provide for the precise stopping, cutting and starting of ribbon 12 by apparatus 120 to deposit adhesive strips having predetermined length in straight or curved fashion on material 54.

Figure 7:
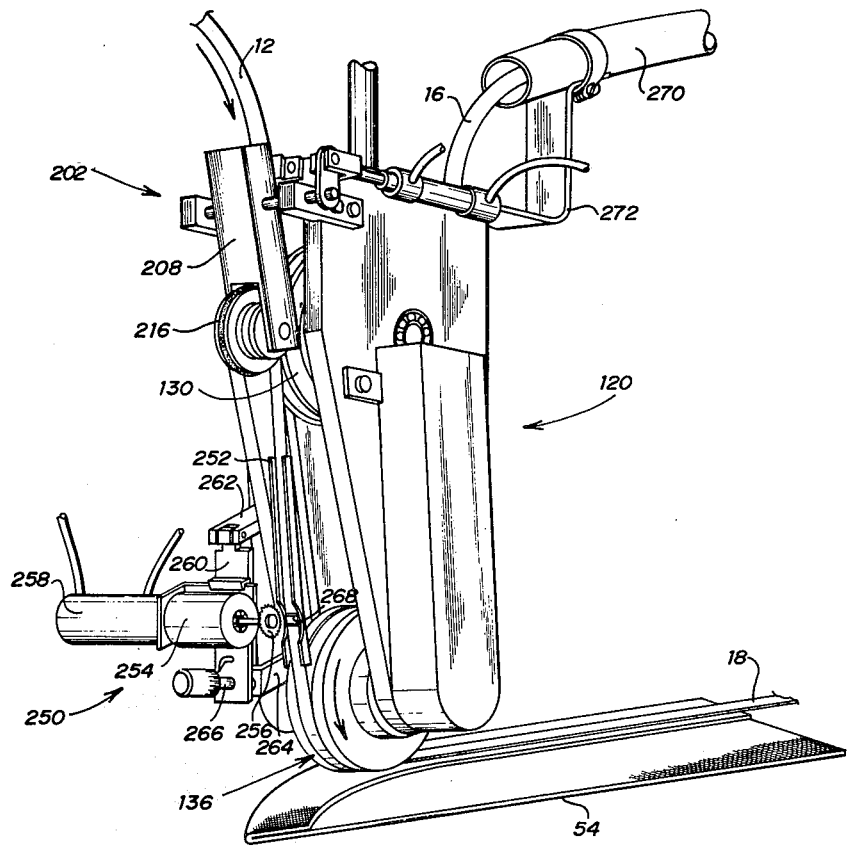
FIG. 7 is an illustration of a fourth modification of the apparatus of FIG. 3.

Referring now to FIG. 7 in conjunction with FIG. 6, there is shown an alternative cutting assembly 250 which can be utilized with apparatus 120 to apply ribbon 12 comprising backing 16 coated on one side with a layer of adhesive 18. Stop/start assembly 202 is shown without optional arm 218, roller 220 and endless belt 222 since backing 16 is simultaneously drawn from wheel 136 as ribbon 12 is fed by pulley 130.

Cutting assembly 250 is positioned adjacent the path of ribbon 12 between pulley 130 and wheel 136. Assembly 250 includes support channel 252 which transports ribbon 12 past electric motor 254 driving a small milling cutter 256. Motor 254 is mounted for movement toward and away from the path of ribbon 12, and is actuated by double acting cylinder 258. Double acting cylinder 258 is responsive to measuring pulley 130 to cause milling cutter 256 to traverse the path of ribbon 12. Cutting assembly 250 is positioned adjacent channel 252 so that only adhesive layer 18 is severed when rotating cutter 256 crosses ribbon 12. In particular, cross member 260 is pivotally attached to upper extension 262, which is secured to side wall 124 according to the preferred construction of the invention. The other end of cross member 260 is adjustably attached to lower extension 264 with, for example, thumbscrew 266. Thumbscrew 266 thus allows cutting assembly 250 to be adjusted to produce separation 168 in adhesive layer 18 only, without severing backing 16. Consequently, after a predetermined length of ribbon 12 is advanced, cutting assembly 250 functions to produce a separation 268 in adhesive layer 18, serving as a transition zone between the ends of successive strips of adhesive 18, whereby the ends of each strip remain well defined during engagement between wheel 136 and material 54.

It will be understood that separation 268 in adhesive layer 18 comprises a significant feature due to the elimination of the taffy effect of stringy material pulling between activated and nonactivated adhesive zones. In addition, the provision of substantial gaps in adhesive layer 18, permits modified apparatus 120 to negotiate sharper turns without disturbing the adjacent ends of successively deposited strips of adhesive.

After the deposition of predetermined strips of adhesive 18, backing 16 continues around wheel 136 drawn by pulley 130 upwardly for collection. A suction tube 270 connected to a vacuum system (not shown) can be positioned on a bracket 272 attached to post structure 122 to collect the separated backing 16.

From the foregoing, it will be understood that the present invention comprises an apparatus for depositing adhesives which incorporates numerous advantages over the prior art. Thus, by means of the invention, preselected lengths of adhesive can be applied in a desired orientation on a length or piece of material prior to subsequent fabrication steps. One of the advantages deriving from the use of the invention involves the elimination of many heretofore prerequisite manual trimming and positioning operations associated with the use of adhesives as a replacement for conventional connection techniques in various operations. Other advantages will be apparent to those skilled in the art.

Although particular embodiments of the invention have been illustrated in the accompanying Drawings and described in the foregoing Detailed Description, it will be understood that the invention is not limited to the embodiments disclosed, but is capable of numerous rearrangements, modifications, and substitutions of steps and elements without departing from the spirit and scope of the invention.

What is claimed is:

1. Apparatus for depositing adhesive strips on a length or piece of material, which comprises:

means for directing a ribbon including a layer of activatable adhesive along a predetermined input path;

means for measuring the length of ribbon directed along the input path;

said directing means being responsive to the measuring means to advance predetermined lengths of ribbon along the input path;

cutter means located along the input path beyond the directing means and responsive to the measuring means for separating at least the adhesive layer of the ribbon to provide adhesive strips having predetermined lengths;

means located along the input path beyond the cutter means for positioning the ribbon adjacent the material onto which the adhesive is to be deposited;

means located along the input path for selectively engaging the adhesive ribbon and the material and activating the adhesive to deposit the strip of adhesive onto the material, said engaging means being movable with respect to the material during deposition of a strip of adhesive material so that linear or curved strips of adhesive can be deposited onto the material; and wherein the directing and measuring means comprise a driven pulley connected to a measuring transducer whereby the pulley functions simultaneously to feed and to measure the ribbons fed along the input path.

2. The apparatus of claim 1 wherein the engaging means comprises a revolving wheel, a portion of the periphery of which constitutes a segment of the path over which the adhesive is guided prior to engagement with the underlying material.

3. The apparatus of claim 1 wherein the driven pulley and the wheel are interconnected for rotation in unison, said pulley and wheel being rotatably supported in structure which is rotatably supported and therefore steerable with respect to the material so that curved or straight strips of adhesive can be deposited onto the material.

4. Apparatus for depositing adhesive strips on a length or a piece of material, which comprises:

a frame mounted for rotation with respect to the material;

a feed pulley rotatably supported on the frame for receiving and transporting a ribbon along a predetermined input path including a portion of the pulley periphery;

said ribbon including a layer of activatable adhesive;

means for measuring the length of ribbon directed along the input path and for selectively operating the feed pulley to advance predetermined lengths of ribbons;

a revolving wheel rotatably supported on the frame and interconnected with the feed pulley for rotation in unison; and said wheel receiving the ribbon from the feed pulley and transporting said ribbon along a predetermined output path including a portion of the periphery of the wheel and into engagement with the adjacent material and activating the adhesive to deposit predetermined lengths of ribbon thereon, said frame being rotatable with respect to the material during deposition to deposit the lengths of ribbons in a desired orientation.

5. The apparatus of claim 4 further including:

structure for guiding the ribbon between the feed pulley and the heated wheel;

a fixed blade secured to the guiding structure;

a movable blade adjacent the input path and opposite the fixed blade; and means responsive to the measuring means to selectively actuate the movable blade to shear the ribbon to form adhesive strips having predetermined lengths.

6. Apparatus for depositing adhesive strips on a length or piece of material, which comprises:

a frame mounted for rotation with respect to the material;

a feed pulley rotatably supported on the frame for receiving and transporting a ribbon along a predetermined input path including a portion of the pulley periphery;

said ribbon including a layer of adhesive and a layer of backing on one side of the adhesive;

means for measuring the length of ribbon directed along the input path and for selectively operating the feed pulley to advance predetermined lengths of ribbon;

a revolving wheel rotatably supported on the frame and interconnected with the feed pulley for rotation in unison;

said wheel receiving the ribbon from the feed pulley and transporting said ribbon along a predetermined output path including a portion of the periphery of the wheel and into engagement with the adjacent material to deposit predetermined lengths of ribbon thereon;

two rollers each rotatably supported on an arm pivotally connected to the frame, said arms being resiliently interconnected to retain said rollers in rolling contact with the feed pulley; and the ribbon being received between one roller and the pulley, and the backing material being received from the wheel between the other roller and the pulley so that the backing material is advanced for collection concurrently with advancement of the ribbon.

7. Apparatus for depositing adhesive strips on a length or a piece of material, which comprises:

a frame mounted for rotation with respect to the material;

a feed pulley rotatably supported on the frame for receiving and transporting a ribbon along a predetermined input path including a portion of the pulley periphery;

said ribbon including a layer of adhesive;

means for measuring the length of ribbon directed along the input path and for selectively operating the feed pulley to advance predetermined lengths of ribbon;

a revolving wheel rotatably supported on the frame and interconnected with the feed pulley for rotation in unison;

said wheel receiving the ribbon from the feed pulley and transporting said ribbon along a predetermined output path including a portion of the periphery of the wheel and into engagement with the adjacent material to deposit predetermined lengths of ribbon thereon;

a body having upper and lower ends and pivotally attached to the frame adjacent the feed pulley;

a first roller rotatably supported on the lower end of said body;

said ribbon being fed into the apparatus betwen the frame and the body and between the feed pulley and the first roller; and means responsive to the measuring means for pivotally actuating the body to selectively block the ribbon against the frame and to simultaneously disengage the first roller from the feed pulley, thereby allowing precise stopping or starting of the ribbon feed.

8. The apparatus of claim 7 further including:

an arm pivotally attached to the lower end of the body; and a second roller rotatably supported on the free end of said arm and interconnected with the first roller by an endless belt forming a segment of the ribbon path between the pulley and the wheel.

9. Apparatus for depositing adhesive strips on a length or piece of material, which comprises:

a frame mounted for rotation with respect to the material;

a feed pulley rotatably supported on the frame for receiving and transporting a ribbon along a predetermined input path including a portion of the pulley periphery;

said ribbon including a layer of adhesive and a layer of backing material on one side of the adhesive;

means for measuring the length of ribbon directed along the input path and for selectively operating the feed pulley to advance predetermined lengths of ribbon;

a revolving wheel rotatably supported on the frame and interconnected with the feed pulley for rotation in unison;

said wheel receiving the ribbon from the feed pulley and transporting said ribbon along a predetermined output path including a portion of the periphery of the wheel and into engagement with the adjacent material to deposit predetermined lengths of ribbon thereon;

structure for guiding the ribbon between the feed pulley and the wheel;

a rotary milling cutter mounted for displacement across the input path to provide separations in the adhesive layer only of the ribbon between successive adhesive strips; and means responsive to the measuring means to selectively cause said cutter to traverse the ribbon forming adhesive strips having predetermined lengths.

10. An applicator for depositing an activatable adhesive on a piece of material, comprising:

a frame disposed above said material and rotatable with respect thereto;

an applicating wheel rotatably supported on said frame and engagable with said material in rolling relationship therealong and including activating means for activating the adhesive, the adhesive being thermally activated and said activating means comprising heating means heating the periphery of said applicating wheel, said heating means being mounted within said applicating wheel, said applicating wheel having an annular applicator portion for engaging said material, said heating means comprising a circular heating band enclosing an electrical resistance means, said applicating wheel further having insulator material on either side of said applicator portion and heating band to prevent undesirably high temperatures in components other than desired applicator portions; and reception means associated with said frame for receiving and guiding an adhesive bearing ribbon along a predetermined input path to the periphery of said wheel for interengagement between said wheel and said material during said rolling therealong to deposit adhesive on said material, said frame being rotatable with respect to said material during deposition of the adhesive so that the adhesive can be deposited along a preselected linear or curvilinear path on said material.

11. The invention according to claim 10 wherein said frame is rotatable about a generally vertical axis, and said wheel rotates about a generally horizontal axis substantially parallel to the general plane of said material therebelow, whereby said applicator is steerable with respect to said material to selectively provide a variably directed adhesive deposition path.

12. The invention according to claim 10 wherein said heating means comprises curvilinear electrical resistance means and wherein said activating means further comprises commutation means including frame mounted brush means engaging wheel mounted brush means connected to said resistance means.

13. The invention according to claim 12 wherein said applicating wheel is rotatably mounted to said frame by a hollow shaft having an opening through a side wall thereof, said wheel mounted brush means being secured to said shaft, said activating means including means connected to terminals of said electrical resistance means and extending into said shaft through said opening to said last mentioned brush means.

14. An applicator for depositing adhesive on a piece of material, comprising:

a frame disposed above said material;

an applicating wheel rotatably supported on said frame and engagable with said material in rolling relation therealong;

reception means associated with said frame for receiving and guiding an adhesive bearing ribbon along a predetermined input path to the periphery of said wheel for interengagement between said wheel and said material during said rolling therealong to deposit adhesive on said material;

said frame being rotatable about a generally vertical axis, and said wheel rotating about a generally horizontal axis substantially parallel to the general plane of said material therebelow, whereby said applicator is steerable with respect to said material to selectively provide a variably directed adhesive deposition path;

said adhesive being thermally activated;

activating means comprising heating means heating the periphery of said applicating wheel for activating said adhesive for adhesion to said material, said heating means being mounted within said applicating wheel;

said heating means comprising electrical resistance means and said activating means comprising commutation means including frame mounted brush means engaging wheel mounted brush means connected to said resistance means;

said applicating wheel being rotatably mounted to said frame by a hollow shaft having an opening through a side wall thereof, said wheel mounted brush means being secured to said shaft, said activating means including means connected to terminals of said electrical resistance means and extending into said shaft through said opening to said last mentioned brush means; and said heating means comprising a circular heating band enclosing said electrical resistance means and secured within said applicator wheel by a clamp ring, and an insulator plate and insulating disk sandwiching therebetween said heating band and said clamp ring, said plate and said disk being comprised of insulative material to prevent undesirably high temperatures in components other than desired applicator portions, and a pair of hubs mounted to said shaft and between which are secured said plate and disk, said shaft being rotatably mounted at its ends to said frame.

15. An applicator for depositing an activatable adhesive on a piece of material, comprising:

a frame disposed above said material and rotatable with respect thereto;

an applicating wheel rotatably supported on said frame and engagable with said material in rolling relation therewith and including activating means for activating the adhesive;

a reception pulley rotatably supported on said frame above said applicating wheel for receiving and guiding an adhesive bearing ribbon to the periphery of said applicating wheel for interengagement between said applicating wheel and said material during said rolling to deposit adhesive on said material, said frame being rotatable with respect to said material during deposition of the adhesive so that the adhesive can be deposited along a preselected linear or curvilinear path on said material; and a start/stop assembly positioned on said frame adjacent said reception pulley, said start/stop assembly having a start position permitting advancement of said ribbon therethrough into engagement with said reception pulley, and having a stop position positively stopping ribbon advancement without carry-through inertia effect of said reception pulley, said start/stop assembly including feed means engagable with said reception pulley in said start position for positive advancement of said ribbon, and wherein said start/stop assembly includes stop means engaging said ribbon in said stop position, and wherein actuation of said start/stop assembly from said start to said stop positions simultaneously disengages said feed means and engages said stop means to thus instantaneously halt advancement of said ribbon, said start/stop assembly comprising an inlet member engaging a stop member in said stop position to block the ribbon thereagainst.

16. The invention according to claim 15 further comprising drive means mounted to said frame motively driving said applicating wheel for advancing said ribbon.

17. The invention according to claim 16 wherein said drive means comprises interconnection means driving said reception pulley and said applicating wheel.

18. The invention according to claim 17 wherein said interconnection means drives said reception pulley and said applicating wheel in unison in the same direction of rotation.

19. The invention according to claim 17 wherein said interconnection means includes an idler sprocket in combination driving said reception pulley and said applicating wheel in opposite rotational directions.

20. The invention according to claim 17 wherein said ribbon has a non-adhesive backing, and further comprising retainer means receiving and guiding said backing along a predetermined output path after said deposition of adhesive.

21. The invention according to claim 20 wherein said retainer means comprises a roller biased into engagement with said reception pulley and driven thereby and receiving therebetween said backing after said adhesive deposition.

22. An applicator for depositing adhesive on a piece of material, comprising:

a frame disposed above said material;

an applicating wheel rotatably supported on said frame and engagable with said material in rolling relation therewith;

a reception pulley rotatably supported on said frame above said applicating wheel for receiving and guiding an adhesive bearing ribbon to the periphery of said applicating wheel for interengagement between said applicating wheel and said material during said rolling to deposit adhesive on said material;

drive means mounted to said frame motively driving said applicating wheel for advancing said ribbon, said drive means comprising interconnection means driving said reception pulley and said applicating wheel;

said ribbon having a non-adhesive backing;

retainer means receiving and guiding said backing along a predetermined output path after said deposition of adhesive, said retainer means comprising a roller biased into engagement with said reception pulley and driven thereby and receiving therebetween said backing after said adhesive deposition; and a second roller biased into engagement with said reception pulley generally opposite said first mentioned roller, said second roller being driven by said reception pulley and receiving therebetween said ribbon before deposition of adhesive.

23. The invention according to claim 22 wherein each said roller is biased by the same biasing means.

24. The invention according to claim 23 wherein each said roller is rotatively carried by an arm pivotally connected to said frame, and wherein said biasing means comprising a helical tension spring between said arms.

25. An applicator for depositing adhesive on a piece of material, comprising:

a frame disposed above said material;

an applicating wheel rotatably supported on said frame and engagable with said material in rolling relation therewith;

a reception pulley rotatably supported on said frame above said applicating wheel for receiving and guiding an adhesive bearing ribbon to the periphery of said applicating wheel for interengagement between said applicating wheel and said material during said rolling to deposit adhesive on said material;

drive means mounted to said frame motively driving said applicating wheel for advancing said ribbon, said drive means comprising interconnection means driving said reception pulley and said applicating wheel;

a start/stop assembly positioned on said frame adjacent said reception pulley, said start/stop assembly having a start position permitting advancement of said ribbon therethrough into engagement with said reception pulley, and having a stop position positively stopping ribbon advancement without carry-through inertia effect of said reception pulley, said start/stop assembly including feed means engagable with said reception pulley in said start position for positive advancement of said ribbon, and including stop means engaging said ribbon in said stop position, actuation of said start/stop assembly from said start to said stop positions simultaneously disengaging said feed means and engaging said stop means to thus instantaneously halt advancement of said ribbon; and said start/stop assembly comprising an inlet member engaging a stop member in said stop position to block said ribbon thereagainst, and carrying a roller rotative mounted thereto which roller engages said reception pulley and said start position advancing ribbon therebetween.

26. The invention according to claim 25 wherein said inlet member is pivotally mounted to said frame and receives said ribbon at one end thereof which end engages said stop member to block said ribbon upon pivoting said inlet member to said stop position, and wherein said inlet member carries said roller at the other end thereof which roller engages said reception pulley upon opposite pivoting of said inlet member to said go position.

27. The invention according to claim 26 wherein said inlet member is pivotally mounted between a pair of spaced extensions from said frame and wherein said stop member is mounted to said frame above said spaced extensions, said inlet member pivoting about an axis parallel to the axis of rotation of said roller and of said reception pulley.

28. the invention according to claim 27 comprising an actuation cylinder mounted to said frame and coupled to a crank arm which is attached to a rod pivotally mounting said inlet member between said spaced extensions, actuation of said cylinder causing pivoting of said inlet member about the axis of said rod.

29. The invention according to claim 26 further comprising an arm pivotally attached to said other end of said inlet member, said arm having a roller rotatably mounted thereto providing additional support for said ribbon between said reception pulley and said applicating wheel.

30. The invention according to claim 29 wherein said arm is pivotally attached at one end to said other end of said inlet member, said last mentioned roller is mounted to the other end of said arm, and comprising interconnection means drivingly connecting both said rollers for rotation in unison.

31. An applicator for depositing an activatable adhesive on a piece of material, comprising:

a frame disposed above said material and rotable with respect thereto;

an applicating wheel rotatably supported on said frame and engagable with said material in rolling relation therewith and including activating means for activating the adhesive;

reception means associated with said frame for receiving and guiding an adhesive bearing ribbon along a predetermined input path to the periphery of said wheel for interengagement between said wheel and said material during said rolling to deposit adhesive on said material, said frame being rotatable with respect to said material during deposition of the adhesive so that the adhesive can be deposited along a preselected linear or curvilinear path on said material;

cutter means disposed between said reception means and said applicating wheel for severing said adhesive; and a start/stop assembly positioned on said frame adjacent said reception means, said start/stop assembly having a start position permitting advancement of said ribbon therethrough into engagement with said reception means, and having a stop position positively stopping ribbon advancement without carry-through inertia effects of said reception means, said start/stop assembly including feed means engagable with said reception means in said start position for positive advancement of said ribbon, and wherein said start/stop assembly includes stop means engaging said ribbon in said stop position, and wherein actuation of said start/stop assembly from said start to said stop positions simultaneously disengages said feed means and engages said stop means to thus instantaneously halt advancement of said ribbon, said start/stop assembly comprising an inlet member engaging a stop member in said stop position to block said ribbon thereagainst.

32. The invention according to claim 31 wherein said cutter means comprises a plate extending across the path of said ribbon and having an aperture through which said ribbon passes, and a movable blade slidably mounted on said plate for selectively shearing said ribbon.

33. The invention according to claim 32 further comprising a finger located beneath said plate to prevent the severed end of said ribbon from falling away from said applicating wheel for a short period immediately prior to its deposition on the material.

34. The invention according to claim 32 further comprising air jet means positioned beneath said cutter means for better maintaining the severed end of said ribbon in contact with said applicating wheel.

35. The invention according to claim 32 further comprising a guide adjustably mounted to said frame between said reception means and said cutter means for displacement to precisely guide and align said ribbon for passage into said cutter means.

36. The invention according to claim 31 wherein said ribbon has a non-adhesive backing, and wherein said cutter means severs only adhesive, not said backing.

37. The invention according to claim 36 wherein said cutter means effects substantial separations of adhesive laterally across said backing.

38. An applicator for depositing adhesive on a piece of material, comprising:

a frame disposed above said material;

an applicating wheel rotatably supported on said frame and engagable with said material in rolling relation therewith;

reception means associated with said frame for receiving and guiding an adhesive bearing ribbon along a predetermined input path to the periphery of said wheel for interengagement between said wheel and said material during said rolling to deposit adhesive on said material;

cutter means disposed between said reception means and said applicating wheel for severing said adhesive;

said ribbon having a non-adhesive backing and said cutter means severing only adhesive, not said backing;

said cutter means effecting substantial separations of adhesive laterally across said backing; and said cutter means comprising a rotary cutter rotating about an axis parallel to the axis of rotation of said applicating wheel, and activating means reciprocating said rotary cutter along its rotation axis laterally across the advancement path of said ribbon.

39. The invention according to claim 38 wherein said cutter means comprises a support channel transporting said ribbon past said rotary cutter, upper and lower extension members mounted to said frame, a cross member pivotally attached at one end to said upper extension member and adjustably attached at its other end to said lower extension, motor means driving said rotary cutter and mounted to said cross member, said adjustable attachment of said other end of said cross member affording adjustment of said rotary cutter perpendicular to its rotation axis toward and away from said ribbon.

40. The invention according to claim 38 further comprising collection means collecting said backing after deposition of adhesive.

41. The invention according to claim 40 wherein said collection means comprises a suction tube and means directing said backing into said tube.

* * * * *

UNITED STATES PATENT AND TRADEMARK OFFICE
CERTIFICATE OF CORRECTION

PATENT NO. : 4,328,061
DATED : May 4, 1982
INVENTOR(S) : JOSEPH W. A. OFF, ET AL.

It is certified that error appears in the above—identified patent and that said Letters Patent is hereby corrected as shown below:

Column 10, line 23, "168" should be --268--;

Column 13, line 1, "betwen" should be --between--.

Signed and Sealed this

Twenty-sixth Day of October 1982

[SEAL]

Attest:

GERALD J. MOSSINGHOFF

Attesting Officer     Commissioner of Patents and Trademarks